United States Patent [19]

Lang

[11] 4,008,482
[45] Feb. 15, 1977

[54] COLOR CODING AND DECODING SYSTEM FOR USE IN MICROGRAPHICS

[76] Inventor: Paul Wentworth Lang, P.O. Box 1000, Orange, Calif. 92668

[22] Filed: Nov. 24, 1975

[21] Appl. No.: 634,522

[52] U.S. Cl. .............................................. 354/104
[51] Int. Cl.² ...................................... G03B 33/10
[58] Field of Search ........................... 354/104, 210

[56] References Cited
UNITED STATES PATENTS

| | | | |
|---|---|---|---|
| 1,238,775 | 9/1917 | Ives | 354/104 |
| 1,951,896 | 3/1934 | Bermpohl | 354/104 |
| 2,000,058 | 5/1935 | Ball | 354/104 |
| 3,700,438 | 10/1972 | Yost | 354/104 X |

Primary Examiner—Donald A. Griffin
Attorney, Agent, or Firm—Ralph B. Pastoriza

[57] ABSTRACT

The system involves splitting the light spectrum from a color picture to be reduced in size into first and second spectral portions which are simultaneously photographed with black and white film. The black and white film can be reduced to an extremely small size for storage. Reproduction of the color picture is accomplished by projecting simultaneously from both black and white film images the respective light spectral portions and recombining them to produce the full color picture.

3 Claims, 3 Drawing Figures

COLOR CODING AND DECODING SYSTEM FOR USE IN MICROGRAPHICS

This invention relates generally to a color coding and decoding system particularly useful in micrographics and more particularly to a novel system for enabling the storage of colored pictures or photographs in compact areas by utilizing black and white film.

BACKGROUND OF THE INVENTION

It is well known in the art to microfilm data and thus enable storage of a vast quantity of such data in an extremely small volume. Essentially, there is little difficulty involved where black and white photographic negative film can be used inasmuch as the grain can be made extremely fine for such black and white film and reproduction into a full sized display of the data presents no problems.

In the case of attempting to store information which includes colors, such as color photographs, many problems arise. The primary and most basic difficulty resides in the fact that color film cannot be reduced to a miniature size corresponding to that of black and white film without substantial loss in clarity. Thus, while it is possible to miniaturize black and white photographs or pictures, the same degree of miniaturization cannot be accomplished for color pictures and as a result substantially more space is required to store color picture information such as, by way of example, complete volumes of the National Geographic magazine.

Major optical companies and photographic industrial concerns have literally spent millions of dollars in attempting to find an appropriate means of miniaturizing for storage purposes color pictures.

BRIEF DESCRIPTION OF THE PRESENT INVENTION

With the foregoing considerations in mind, the present invention contemplates a novel system which is in essence enables the storage in a very compact space of color picture information without sacrifice of clarity of detail when the color picture is reproduced.

Briefly, the method of the invention includes the steps of optically dividing the light spectrum from a color picture into first and second spectral portions and then exposing simultaneously first and second miniature black and white film negatives to the spectral portions respectively. The black and white film negatives can be reduced to an extremely small size as compared to conventional type color film. Accordingly, the first and second black and white film negatives can be developed into positive prints or transparencies of extremely small size and stored until such time as it desired to reproduce the color picture.

When it is desired to reproduce the picture, a suitable projection system is provided which may constitute essentially the same hardware utilized in photographing the original color picture with the addition of projection light bulbs and the first and second transparencies are projected, the respective spectral portions from each being recombined to thereby produce the full color picture.

In preferred apparatus for carrying out the invention, there is provided beam splitting means preferably in the form of prisms together with first and second lenses for channeling the respective spectral portions to the first and second black and white negatives. These negatives are held in a holding gate which also serves to hold developed transparencies for subsequent projection so that much of the same apparatus utilized in photographing the original color picture can be used in projecting the same.

BRIEF DESCRIPTION OF THE DRAWINGS

A better understanding of this invention will be had by now referring to the accompanying drawings in which.

DETAILED DESCRIPTION OF THE INVENTION

Figure 1:
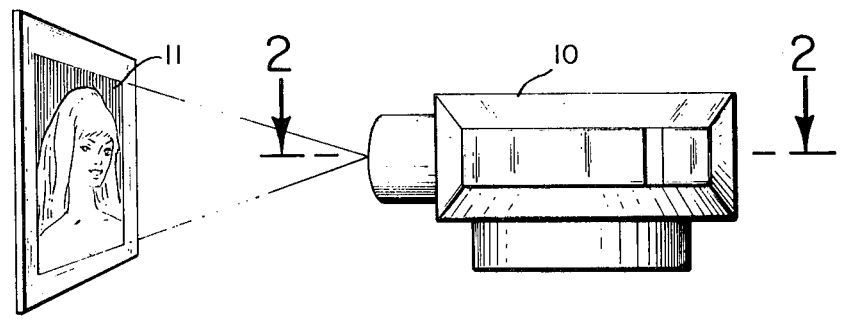
FIG. 1 is a perspective view of a camera/projector device for miniaturizing a color picture for storage purposes and subsequent reproduction in accord with this invention.

Referring first to FIG. 1, there is shown a camera 10 which, as will become clearer as the description proceeds, may also serve as a projector. This camera is designed in accord with the present invention to take photographs of color pictures such as indicated at 11 wherein the negative film can be reduced to an extremely small size for storage purposes. This miniaturization is made possible in accord with the present invention by utilizing first and second black and white film negatives rather than color film and storing color information onto the respective black and white negative films.

Thus, in accord with the method of this invention as described briefly heretofore, the light spectrum from the color picture 11 is optically divided into first and second spectral portions. The first and second miniature black and white film negatives within the camera 10 are simultaneously exposed to the first and second spectral portions respectively. The negatives are then developed into positive prints in the form of transparencies for storage purposes.

Reproduction of the full color picture 11 is accomplished by simply projecting the respective spectral portions from the first and second black and white positive transparencies simultaneously and recombining them optically.

In the specific embodiment disclosed, the first spectral portion corresponds to a red region in the visible light spectrum and the second spectral portion corresponds to a blue region in the visible light spectrum. The first black and white film negative is a special type black and white film made sensitive or responsive to red light.

A further step in the method involves filtering out all light from the first spectral portion except red and filtering out all light from the second spectral portion except blue prior to respectively exposing the first and second miniature black and white film negatives to the spectral portions so that the negatives are exposed to a pass band of red light and a pass band of blue light. In reproduction, the respective pass bands are projected through the filters prior to recombining the same.

Figure 2:
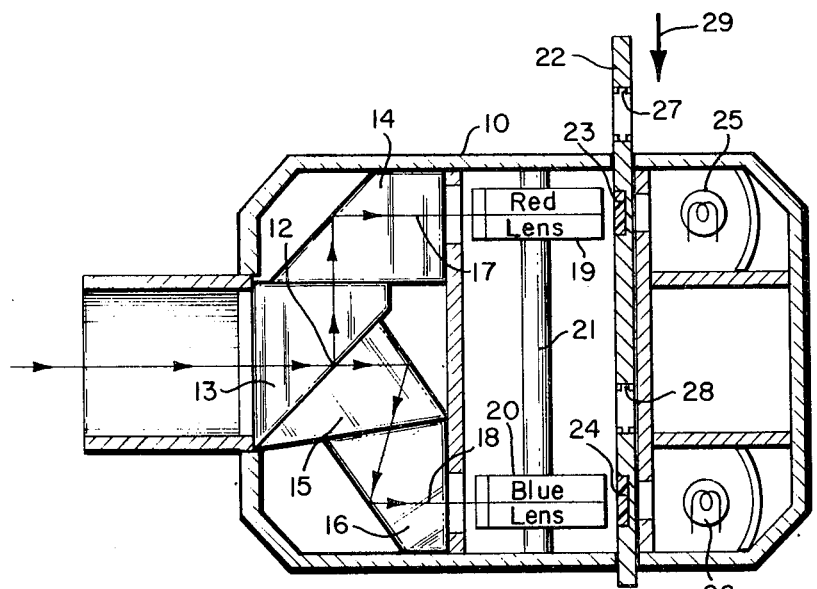
FIG. 2 is a top cross section taken in the direction of the arrows 2—2 of FIG. 1; and, FIG. 3 is a plot illustrating the transmission and reflectance characteristics of a light spectrum dividing means utilized in the camera of FIGS. 1 and 2.

Referring to FIG. 2, details of the combination camera and projector 10 of FIG. 1 are illustrated, this device constituting one means for carrying out the above-described method.

As shown, within the camera body 10 there is provided a light spectrum dividing means 12 for splitting the light spectrum from the scene 11 into the referred to first and second different spectral portions. Towards this end, the light dividing means constitutes coatings 12 on a 45° prism 13 which functions essentially to split the incoming beam into the referred to spectral portions, these first and second spectral portions being reflected through prism 14 for the first spectral portion and prisms 15 and 16 for the second spectral portions to provide separate parallel paths of light 17 and 18 as shown.

Suitable first and second filtering lens 19 and 20 are positioned in the camera body 10 for receiving the first and second spectral portions, these lens filtering out from the spectral portions all light except for a pass band of red and all light except for a pass band of blue, respectively. The respective lenses may be supported on a cross bar 21 in the camera body 10.

Holding means for supporting the first and second black and white film negatives in the camera in positions behind the first and second lens respectively for exposure to spectral bands within the first and second spectral portions is shown at 22 and takes the form of a slidable gate structure. The first and second black and white film negatives themselves are indicated at 23 and 24 respectively and in the specific position of the holding means or gate 22, the negative films 23 and 24 are at the focal points of the respective lens 19 and 20 preparatory to being exposed to the picture 11.

After suitable exposure of the black and white negatives 23 and 24, they are removed from the gate or holder 22 by simply sliding the same from the camera body 10 and developed into positive prints or transparencies for storage.

As mentioned, the same camera body 10 can serve as a projection means for reproducing the color picture from the first and second black and white film negatives. Towards this latter end, the camera body 10 incorporates projection light means in the form of first and second projection bulbs 25 and 26 in the rear portion of the camera in axial alignment with the optical axes of the lenses 19 and 20 respectively.

It will be noted that the holder or sliding gate 22 includes transparency holding means 27 and 28 which will be positioned between the respective first and second lenses and the corresponding projection lights 25 and 26 when the gate holding structure 22 is slid transversely in the camera body 10 in the direction of the arrow 29 a sufficient distance.

It will be appreciated from the foregoing that when the transparencies are projected, the respective projected spectral portions will pass through the first and second lens 19 and 20 and be recombined by the light spectrum dividing means 12 to pass out the front of the apparatus onto a screen wherein the color picture 11 will be reproduced.

Figure 3:
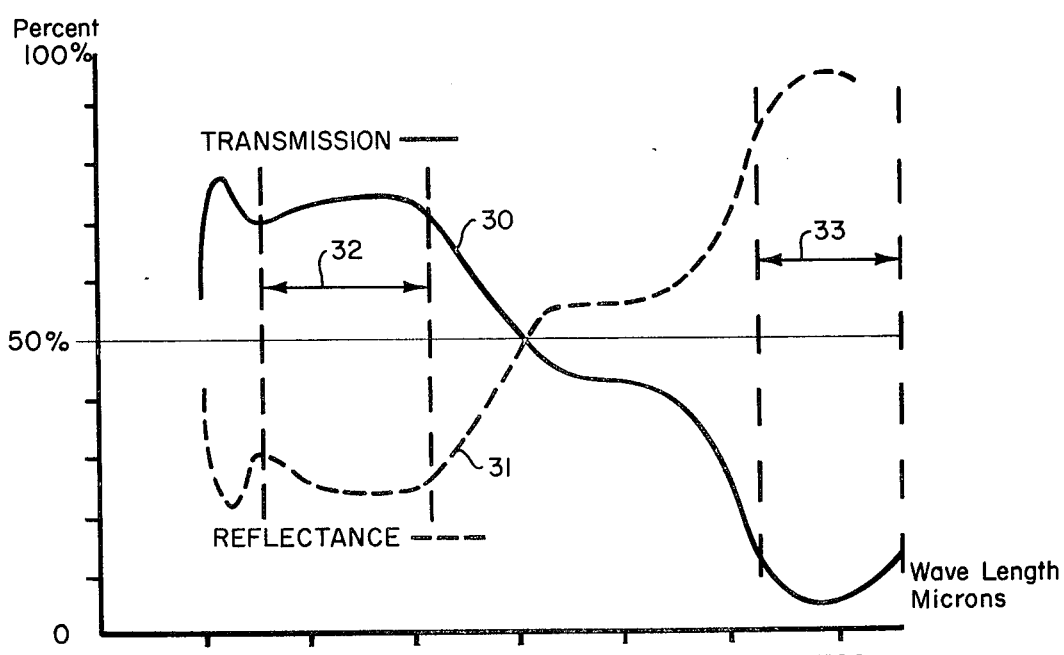

Referring now to FIG. 3, the optical characteristics of the light spectrum dividing means 12 described in FIG. 2 are graphically displayed. Thus, the curve 30 represents the transmission characteristic of the coating 12 for the 45° beam splitting prism 13; that is, the percentage of transmission of the light spectrum from the picture over the range of from about 0.4 microns to 0.75 microns. The dashed curve 31 on the other hand represents the reflectance of the complete light spectrum over the foregoing wave length range.

It will be noted from the curves 30 and 31 that the first spectral portion following the light path 17 described in FIG. 2 is in the red portion of the visible spectrum; that is, from 0.55 microns to 0.74 microns. The second spectral portion following the optical path 18 on the other hand is in the blue region of the visible spectrum; that is, from about 0.41 microns to 0.550 microns.

The effect of the red and blue lens filters 19 and 20 is to define a red and blue pass band respectively within the first and second spectral portions. These pass bands are indicated at 32 and 33 in FIG. 3 and constitute wave lengths associated with the distinctly separated red and blue colors.

Thus, it will be evident that in combination with the spectral dividing prism 13, the filter lens 19 and 20 will result in distinct and separated colors of the visible spectrum derived from the color picture 11 passing to the respective first and second black and white negatives to expose the same. Essentially, a color coding of the picture or photograph is effected on the black and white negative film.

In the projection of the black and white negative film as described in conjunction with FIG. 2, the reverse process takes place, the distinct pass band spectral portions simply being recombined. The result is that the full color picture is readily reproduced.

Since detailed information can readily be registered on black and white film of extremely small dimensions as compared to color film, the present invention provides a simple means for reducing for storage purposes color picture information on black and white film and ultimately reproducing the same without appreciable loss of fidelity.

What is claimed is:

1. A color coding and decoding device for use in micrographics including, in combination:
  a. a camera body;
  b. a light spectrum dividing means secured in said camera body for splitting the light spectrum from a scene of which a picture is to taken into first and second different spectral portions;
  c. first and second lens in said camera receiving said first and second spectral portions;
  d. a slide member in said camera having negative film holding means for holding first and second black and white film negatives in said camera in positions behind said first and second lens respectively for exposure to spectral bands within said first and second spectral portions, when the slide member is in a first position; and
  e. projection light means behind said holding means, said holding means also including transparency holders for holding transparencies behind said lens and permitting light to pass from said projection light means through the transparencies when said slide member is moved to a second position, whereby first and second black and white negatives are provided from which positive prints may be made in the form of slide transparencies and subsequently received in said transparency holders for projection back through said lens and said spectrum dividing means onto a screen such that the spectral portions are recombined to produce the original scene.

2. The subject matter of claim 1, in which said first spectral portion corresponds to a red region in the visible light spectrum and said second spectral portion corresponds to a blue region in the visible light spectrum, and wherein said first and second lens include respectively red and blue filters for filtering out all light from the first spectral portion except red and all light from the second spectral portion except blue so that red and blue spectral bands are received respectively by the first and second film negatives, said first black and white film negative being sensitive to red light.

3. The subject matter of claim 1, in which said first spectral portion extends from approximately 0.550 to 0.740 microns and said second spectral portions extends from approximately 0.410 to 0.550 microns.

* * * * *